United States Patent [19]

Diner et al.

[11] 4,044,156
[45] Aug. 23, 1977

[54] RUMINANT FEED SUPPLEMENT AND PROCESS FOR PRODUCING SAME

[75] Inventors: Uriel Diner; Richard MacLeod Elofson, both of Edmonton, Canada

[73] Assignee: The Research Council of Alberta, Edmonton, Canada

[21] Appl. No.: 536,118

[22] Filed: Dec. 24, 1974

[51] Int. Cl.² .............................................. A23K 1/14
[52] U.S. Cl. ...................................... 426/69; 426/807
[58] Field of Search ........................ 260/211.5 R, 211; 426/2, 69, 18, 807, 658

[56] References Cited

U.S. PATENT DOCUMENTS

| | | | |
|---|---|---|---|
| 2,612,497 | 9/1952 | Meijer | 260/211.5 R X |
| 3,020,273 | 2/1962 | Steadman et al. | 260/211.5 R |
| 3,023,205 | 2/1962 | Steyermark et al. | 260/211.5 R |
| 3,677,767 | 7/1972 | McNeff | 426/2 |
| 3,843,799 | 10/1974 | Elofson et al. | 426/69 X |
| 3,878,304 | 4/1975 | Moore | 426/69 |

OTHER PUBLICATIONS

Cadmus et al., "Enzymatic Production of Glucose Syrup from Grains & its Use in Fermentations."

*Primary Examiner*—Joseph M. Golian
*Assistant Examiner*—R. B. Penland
*Attorney, Agent, or Firm*—E. P. Johnson

[57] ABSTRACT

The starch in barley or a like grain is hydrolyzed with the enzyme glucoamylase to produce glucose. The glucose is then reacted with urea under drying conditions to produce a high assay mixture of ureides, mainly monoglucosyl ureide. The end product is found to be a useful non-protein nitrogen feed supplement for cattle.

3 Claims, 2 Drawing Figures

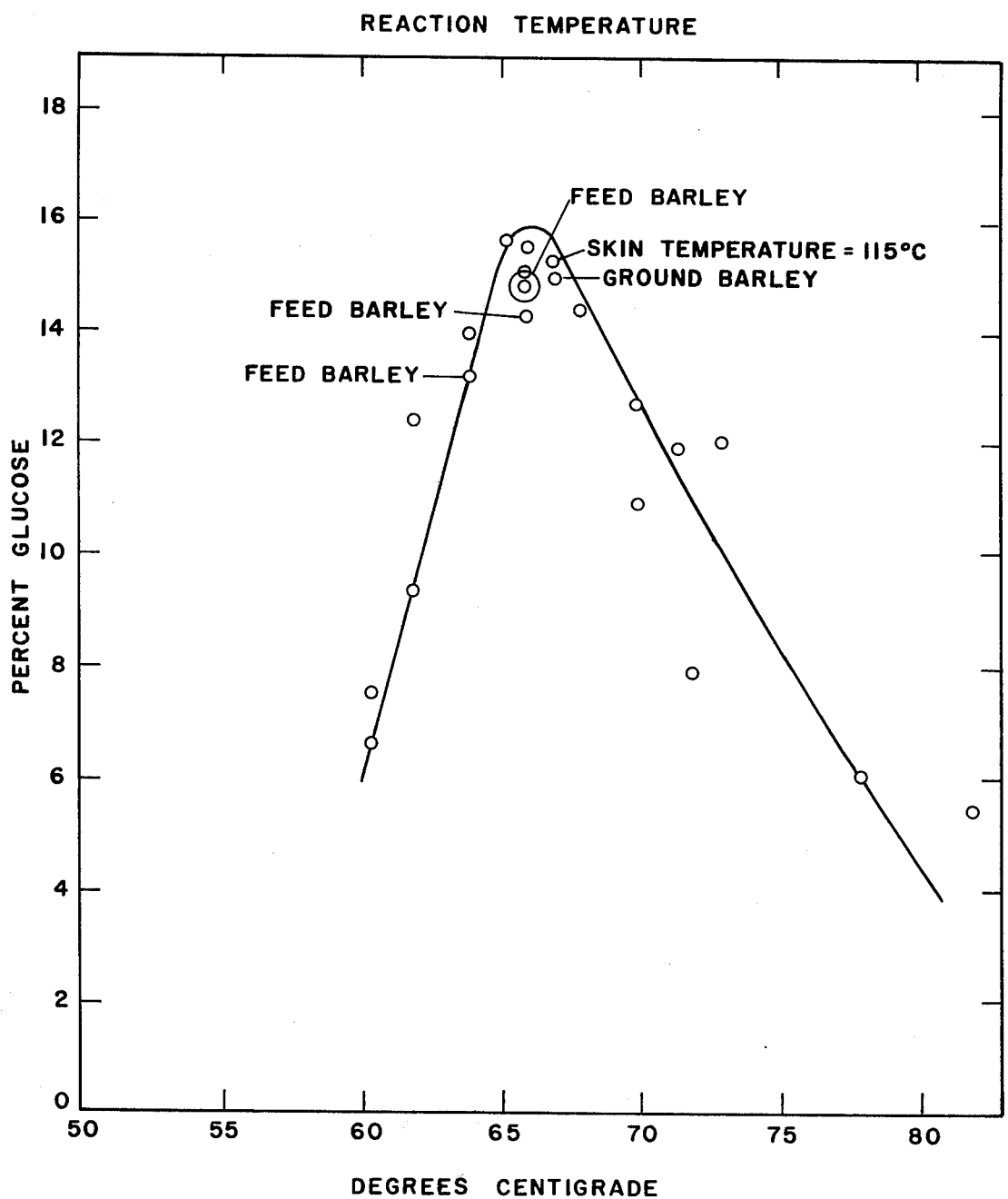

RUMINANT FEED SUPPLEMENT AND PROCESS FOR PRODUCING SAME

BACKGROUND OF THE INVENTION

This invention relates to a process for producing a non-protein nitrogen (NPN) containing material useful as a feed supplement for cattle and sheep. More particularly, it relates to a process for producing urease-resistant glucosyl ureides and to the high assay product of the process.

It is now common to feed supplements to cattle and sheep. These supplements provide a source of nitrogen for meeting the protein needs of the animals. The most commonly used supplement is urea. When the urea enters the rumen of the animal, the enzyme urease acts on it to form ammonia. The microorganisms in the rumen then convert the ammonia into a form of protein which can be utilized by the animal.

There is a disadvantage in using urea in that it is converted to ammonia at a relatively rapid rate. If the dosage of urea is too large, the capacity of the microorganisms to convert the produced ammonia to protein is exceeded and the excess ammonia is either converted to urea and excreted by the animal or, if its concentration is high enough, it can be toxic.

Recent work has been directed toward developing "slow release" NPN compounds. The objective is to provide compounds which produce ammonia in the rumen at a reduced rate with which the microorganisms can cope.

One family of compounds, glucosyl ureides, is known to have the property of slow release of ammonia in the rumen of cattle or sheep. These compounds have the added advantage of providing the ammonia in association with an energy source (glucose), which promotes greater growth of the microflora in the rumen. A United States patent of interest in this connection issued to McNeff under No. 3677767. This patent teaches reacting molasses (which contains glucose and non-reducing sugars, such as fructose) with urea under acidic conditions to produce a liquid product containing glucosyl ureide. The product has been shown to be useful as a feed supplement for ruminant animals.

Other pertinent prior art is exemplified by U.S. Pat. Nos. 2612497, issued to Meijer; 3023205, issued to Steyermark; and 3020273, issued to Steadman.

SUMMARY OF THE INVENTION

The present invention is concerned with a known reaction whereby glucose is combined with urea under acidic conditions to produce glucosyl ureides. However, in accordance with the invention the process is carried out in a manner such that a relatively high degree of conversion of the glucose is achieved, and the end product contains a relatively high concentration of ureides.

More particularly, glucose is reacted with urea under acidic and drying conditions to produce a product, preferably solid, containing a relatively high proportion of urease - resistant glucosyl ureides.

When first considering drying the glucose-urea mixture during reaction to drive off water and shift the equilibrium of the reaction toward producing more ureides, we anticipated that the concentration of acid would increase, leading to dehydration and undesired carmelizing. Surprisingly, the pH of the acidic mixture actually increases during the drying process. Carmelizing is not a serious problem. In retrospect, it appears that ammonia, released from the urea, or protein, which is present if one uses hydrolyzed grain as the starting material, buffers the reaction to permit it to proceed to completion.

Since drying is an integral part of the process, we prefer to use a glucose-containing starting material which is relatively free of other hexoses, which make drying difficult and which can result in charring of the final product. We have found that grain starch, such as that occurring in barley, wheat or corn, may be hydrolyzed to provide a preferred starting material containing glucose. If, for examle, molasses is used in the process, it will not readily dry to a useful product, due to the presence of a mixture of sugars and the tendency of contained fructose to char. However, we have found that some hygroscopic mixtures of sugars can be tolerated in the starting mixture, provided that inert materials, such as grain husks, are also present.

The product of the process comprises a solid, condensation reaction product of (1) glucose-containing hydrolyzate of grain, selected from the group consisting of barley, wheat and corn, and (2)urea, said product containing the major proportion of said glucose in the form of glucosyl ureides.

The process for producing the desired mixture of glucosyl ureides comprises the steps of: (1) providing an aqueous mixture of a starting material containing one or more reducing carbohydrates as the major dry matter constituent, the major constituent of said reducing carbohydrates being glucose, and urea, and (2) reacting the mixture under acidic and drying conditions to convert the major portion of the glucose and urea into glucosyl ureides and to produce a solid product for use as a NPN feed supplement for ruminants.

DESCRIPTION OF THE DRAWINGS

In the drawing:

FIG. 2 is a plot showing the effect of temperature of the reaction mixture on the hydrolysis reaction.

DESCRIPTION OF THE PREFERRED EMBODIMENT

Figure 1:
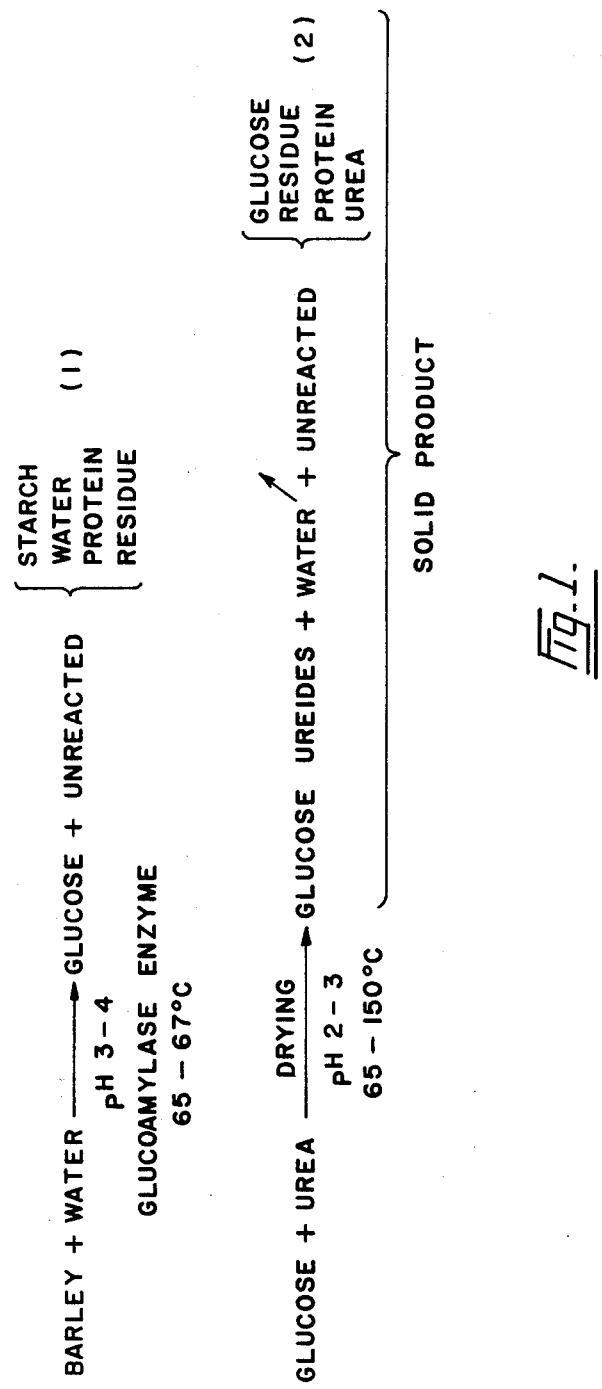
FIG. 1 shows a preferred form of the process outlined in the terms of chemical equations for the hydrolysis and condensation reactions.

The invention will now be described in terms of providing glucose by hydrolyzing starch present in barley. While a number of grains, such as wheat, corn and the like can be used, barley is preferred as it is commonly used in Western Canada as cattle feed.

Equipment and analysis procedures

The hydrolysis reaction was carried out in a 500-ml reactor provided with stirrer, inlets for introduction of reagents and sampling, a mantle, and a temperature controller capable of keeping the temperature within ± .5° C.

The glucose analyses were performed by the orthotoluidine method and by the use of a Beckman glucose autoanalyzer, Model ERA-2001. The first method involves the reaction of the glucose present with o-toluidine in acetic acid. The color is measured spectrophotometrically using 5 determinations for each sample, one for the blank, and one for the standard. The error of the method was found to be 2%. Time employed for each determination: 45 minutes.

The second method involves the oxidation of the glucose to gluconic acid by a glucose oxidase. The oxygen used, proportional to the glucose present, is measured and expressed in percent glucose. Error similar to the o-toluidine method; time for analysis: 3 minutes per sample (maximum).

Due to a combination of errors (error of the analysis of glucose plus error involved in the hydrolysis reaction) two results that differed from each other to an extent of 5% were considered identical.

Only in cases where the results were significantly different was it concluded that the parameters studied had an influence on the yield of glucose.

Urea was analyzed by hydrolyzing it to ammonia with the enzyme urease, and determining the ammonia either potentiometrically by the use of an ion specific electrode, or by colorimetry by reaction of the ammonia with sodium nitroprusside plus sodium salicylate in the presence of sodium dichloroisocyanurate.

Using this last method, the ammonia plus free urea present are analyzed together, and the final result expressed as percent of free urea present.

Ureides were determined by paper chromatography and by the use of a Waters liquid chromatograph, Model M6000, using a system of columns packed with Bondpak X Corasil*, and as solvent, a mixture made up of four parts of a 2-to-1 mixture is isopropanol ethylacetate and one part distilled water.

Starch determination was done by treatment of a known amount of barley suspended in water with 85% phosphoric acid (pH 1.5 - 2) at 80° C overnight. A control experiment was done at the same time with pure potato starch. This first treatment liquefied all the starch present. After cooling and adjusting the pH to 4.5 sodium hydroxide, both unknown and control were treated with the same amount of glucoamylase at 62° C for 24 hours. The glucose present was analyzed, and the result obtained from barley corrected according to the glucose obtained from the control experiment. The content of starch was found to be 55% on a dry basis.

The Hydrolysis Reaction

There are several known procedures available for hydrolyzing starch to produce glucose useful for this invention. For example, one may liquify starch by mixing a 30% aqueous suspension of starch with 0.07% of α-amylase at a pH of 6.9. The temperature is held at 70°-75°-80°-85° C for 15 minutes at each temperature. The mixture is then boiled for an hour, cooled to 85° C, and 0.04% of α-amylase is added and the mixture kept at 82° C for 30 minutes. Agitation is maintained throughout these steps. The reaction mixture is then cooled to 60° C, the pH is adjusted to 4.0-4.5 with HCl, 0.1% of the enzyme amyloglucosidase (commonly termed glucoamylase) is added and the product incubated at 60° C for 24 hours to complete conversion of the starch to glucose.

However, we prefer to use a novel process wherein only one enzyme, glucoamylase, is used under particular conditions to convert at least 90% of the starch to glucose. More particularly, an aqueous mash of ground barley is mixed with an appropriate amount of glucoamylase under acidic conditions at temperatures within the range 65°-67° C and reacted for sufficient time to achieve the desired degree of conversion. In a preferred embodiment, ground barley is slurried with water in a proportion of between 140-240 parts per 100 parts of grain. Acid, usually 85% phosphoric acid, is added to bring the pH to about 3.0-4.5. Glucoamylase, preferably in the form of an aqueous solution containing 100 units per milliliter, is added and the temperature is then raised to about 66° C. Eighty milliliters of enzyme solution will hydrolyze 100 pounds of liquified starch in 72-96 hours at 62° C and pH4. The enzyme addition may be from 30 to 60 units per 100 grams of barley. The reaction is carried on for about 10 to 15 hours. A runny slurry or soup is obtained containing about 15% glucose. The process converts about 90% of the starch to glucose.

A number of variables that could influence the course of the novel hydrolysis reaction have been investigated. Each one was examined under a set of standard conditions, so only one variable was changed at a time. The standard conditions were:

100 g. of whole barley, crushed to 4/64 inches
240 ml. water
pH 4-4.5 by use of 85% phosphoric acid
0.6 ml. of glucoamylase added in two batched;
0.3 ml. at zero time and 0.3 ml. four hours later
-reaction time - 24 hours It was found that the ratio of 240 ml. of water/100 g. of barley gave a handleable porridge at the beginning of the reaction, and a final runny soup that was also easily handled. A pH close to 4 is the optimum acidity for the enzyme glucoamylase.

The following variables were found to have little effect on the reaction: particle size (ranges tried: 2/64 - 4/64 inches); type of water (tap water vs. distilled water); stirring; whole or dehusked barley; type of barley; moisture content of the barley; and temperature gradient within the reactor.

One variable, temperature of the reaction mixture, was found to have an effect on glucose yield. As illustrated in FIG. 2, glucose yields were poor outside the reaction temperature range of 65° - 67° C. Yields were maximized at about 90% within this range.

The process has advantages over the prior art in that (1) it is a single enzyme treatment as compared to the double enzyme treatments previously used; (2) lower temperatures are used; and (3) the reaction does not require vigorous agitation. These differences result in a simpler process.

The Condensation Reaction

Once the glucose - containing hydrolyzate is available, it is reacted with urea under acidic drying conditions to produce glucosyl ureides. The reaction is preferably carried out to maximize the yield of ureides, particularly of monoglucosyl ureide, while minimizing the production of caramel and other products of the decomposition of glucose. Therefore it is normally conducted under mild temperature conditions to produce a solid product. At this time, the process has been developed to the point where yields in the order of 90% may be achieved.

The hydrolyzate is reacted with an amount of urea which is preferably slightly in excess of that amount required stoichiometrically to combine with the glucose to produce monoglucosyl ureide. We normally use about a 10% excess of urea. One can, if desired, react the glucose with less than the stoichiometric amount — this approach has the advantage of providing free glucose in the supplement, thereby improving its palatability; however, normally the objective of maximizing conversion to ureides is overriding. Alternatively, one can use a larger excess than 10%. However, we have not noted any significant increase in yield when excesss of 200% and 300% were used.

The pH of the starting reaction mixture is established at about 2-4.

The drying operation is influenced by temperature, retention time and depth of bed. In general, we seek to maximize conversion by drying to a solid state without significant charring. One should keep in mind that, if the temperature is too high, charring can occur if the retention time is too long. Most of our drying investigations have been carried out on a laboratory batch basis using a thin layer (about 5/16 inches) of reaction on trays in a hot air oven. Under these conditions, drying is carried out at a temperature of about 75°-90° C for a prolonged period, usually in the order of 10 - 24 hours. However, we have also successfully carried out trials in a rotary hot air drier having an inlet air temperature of 600° F and outlet temperature of 300° F. The retention time used was only seconds to produce a solid product.

In the case of barley, the preferred end product is a solid brown material having the following typical composition:

| | |
|---|---|
| monoglucosyl ureide | 21.0% |
| diglucosyl ureide | 8.0% |
| Water insoluble matter from barley | 25.0% |
| Water soluble matter from barley | 16.0% |
| Free glucose | 3.5% |
| Free urea | 4.4% |
| Phosphate | 4.5% |
| Water | 3.0% |
| Unidentified compounds (Mostly nitrogenous compounds derived from glucose and urea) | 14.6% |

The invention will be further understood with reference to the following examples:

EXAMPLE 1

This example provides a detailed description of a preferred method for carrying out the hydrolysis and condensation reactions.

The example involved hydrolysis of whole barley, followed by the reaction of said hydrolyzed barley with urea plus phosphoric acid. 100g of crushed whole barley with a moisture content of 11%, 240 ml of water, and 0.6g of 85% phosphoric acid were mixed together at room temperature. Thirty units of Diazyme L-100[3] were added to the mixture and heat was applied with stirring so that the reaction mixture was brought to 65° C in approximately 45 minutes. Three hours after having reached this temperature, 30 more units of Diazyme L-100 were added and the mixture kept for approximately 10 hours at 65° C under stirring.

At this stage, the glucose content of the barley hydrolyzate was found to be 16.3% of 90% of the theoretical amount.

To 100g of barley hydrolyzate containing 14g of glucose were added 4.68 g of urea (no excess) and 1g of 85% phosphoric acid. The mixture was spread out on a plastic tray, the thickness of said mixture being 6 to 7 mm, and held at 75° C for 14 hours. At this time analysis of glucose by the glucose oxidase method showed 5.5%, which represents a conversion of 89%. Analysis of the product showed urea plus ammonia, expressed as urea, 3.36%; ureides expressed as monoglucosyl urea, 37.1%[4]; combined nitrogen, expressed as monoglucosyl urea, 37%; total nitrogen, 7.76%. [3]Registered trade mark for glucoamylase manufactured by Miles Laboratories, Elkhart, Indiana, U.S.A. Eighty units of said enzyme will hydrolyze 100 pounds of liquefied starch in 72 to 96 hours at 62° C and pH4. [4]Analyzed by a potentiometric method.

EXAMPLE II

This example shows the results obtained when a 10% excess of urea is used.

To 100g of barley hydrolyzate prepared according to Example I, containing 15.6g of glucose, were added 5.7g of urea (10% excess) plus 1.1g of 85% phosphoric acid. The mixture was placed on a plastic tray, the thickness of said mixture being close to 7 mm, and kept at 75° C for 14 hours. At this stage, the solid product showed the following analysis: Glucose, 1% (conversion of glucose 98%); ammonia, expressed as urea, 0.46%; ammonia plus free urea, expressed as urea, 3.74%; ureides, expressed as monoglucosyl urea, 40.3%[4]; combined nitrogen, expressed as monoglucosyl urea, 43%; total nitrogen, 8.6%.

EXAMPLE III

This example shows the effect of increasing the temperature during the drying operation.

To 100g of barley hydrolyzate, prepared according to Example I and containing 12.6 g of glucose, were added 4.6g of urea (10% excess) plus 1g of 85% phosphoric acid. The mixture was placed on a plastic tray, the thickness of said mixture being 10 mm, and kept at b 95° C for 5 hours. At this time the solid material was broken into small pieces and held at 95° C for 2 more hours. The solid material gave the following analysis: glucose, 2% (conversion of glucose 94%); ammonia, expressed as urea, 0.26%; ammonia plus free urea, expressed as urea, 2.9%; ureides, expressed as monoglucosyl urea, 34.4%[4]; combined nitrogen, expressed as monoglucosyl urea, 40%; total nitrogen, 8.0%.

EXAMPLE IV

This example is similar to Example II, however a longer retention time is used.

To 100g of barley hydrolyzate, prepared according to Example I and containing 13g of glucose, were added 4.76g of urea (10% excess) plus 0.95g of 85% phosphoric acid. 100g of this mixture were poured into a plastic tray, the thickness of the said mixture being 7 mm, and kept at 75° C for 24 hours. At this stage, 30.6g of solid material were obtained that gave the following analysis: glucose, 3.2% (conversion of glucose 92%); ammonia plus urea, 2.81% monoglucosyl urea, 18.9%; combined nitrogen, expressed as monoglucosyl urea, 46%; total nitrogen, 8.67%.

EXAMPLE V

This example shows the use of only 85% of the stoichiometric amount of urea required to react with the glucose to produce monoglucosyl ureide.

To 100g of barley hydrolyzate, prepared according to Example I and containing 13g of glucose, were added 3.68g of urea (85% of stoichiometric amount) plus 0.73g of 85% phosphoric acid. 100g of this mixture were poured into a plastic tray, the thickness of the said mixture being 7mm, and kept at 75° C for 24 hours. At this time, 30g of solid material were obtained that gave the following analysis: glucose, 8.1% (conversion of glucose 80%); ammonia plus urea, expressed as urea, 2.06%; monoglucosyl urea, 16.7%; combined nitrogen, expressed as monoglucosyl urea, 36%; total nitrogen, 7.0%.

EXAMPLE VI

This example shows the effect of using a 100% excess of urea.

To 100g of barley hydrolyzate, prepared according to Example I and containing 13g of glucose, were added 8.66g of urea (100% excess) plus 1.73g of 85% phosphoric acid. 100g of this mixture were poured into a plastic tray, the thickness of the said mixture being 7 mm, and kept at 75° C for 24 hours. At this stage, 32.9g of solid material were obtained that gave the following analysis: glucose, 0.6% (conversion of glucose 98.3%); ammonia plus urea, expressed as urea, 10.67% monoglucosyl urea, 27.8%, combined nitrogen, expressed as monoglucosyl urea, 47%; total nitrogen, 12.27%.

EXAMPLE VII

This example shows the use of corn as the source of starch in the hydrolysis reaction.

100g of corn (whole grain, 18,9% moisture) were mixed with 240 mls of tap water and ground exhaustively. The pH was adjusted to 4.5 with 85% phosphoric acid and 30 units of Diazyme L-100 added. Stirring was commenced and the temperature was raised to 67° C. At this time, 30 units of Diazyme L-100 were added and the reaction was carried on for 24 hours. A yellow, runny soup was obtained - it contained 14.6% glucose.

EXAMPLE VIII

This example shows the use of wheat as the source of starch in the hydrolysis reaction.

100g of whole ground wheat (12.4% moisture) were mixed with 240 mls of tap water. The pH was adjusted to 4.7 by the addition of 0.6g of 85% phosphoric acid. 30 units of Diazyme L-100 were added and stirring was commenced. The temperature was raised to 67° C over a period of 1 hour. The reaction was continued at this temperature and, after 3 hours, an additional 30 units of Diazyme L-100 were added. The reaction was then continued for a total reaction time of 16 hours. 340 g of hydrolyzate containing 14% glucose were obtained.

To 100g of the wheat hydrolyzate were added 5.2g of urea (10% excess) plus 1g of 85% phosphoric acid. The mixture was placed in a plastic tray to a thickness of 7 mm, and kept at 75° C for 14 hours. At this stage, the solid material gave the following analysis: glucose, 4.8% (conversion 90%); ammonia plus free urea, expressed as urea, 2.39%; ureides, [4] expressed as monoglucosyl urea, 41.63%; total nitrogen, 8%.

EXAMPLE IX

This example shows the results of drum-drying. Barley hydrolyzate containing 13.8% glucose was rapidly evaporated using a rotary drum under the following conditions:

Thickness of product: 0.025 inches
Steam pressure: 48 psi
Production: 1.45 pounds of dry material per foot [2] per hour
Slurry feed rate: 4.55 pounds/hour
Surface area: 0.962 foot [2]
Drying time: 37 seconds In this way, a rapid evaporation of water was achieved, however less glucose was converted to ureides compared to the previous examples. A solid product was obtained that gave the following analysis: glucose, 15% (conversion 70%); urea plus ammonia, expressed as urea, 5.41%; combined nitrogen, expressed as monoglucosyl urea, 35.0%; monoglucosyl urea, 12.7%, total nitrogen, 8.4%.

EXAMPLE X

This example shows the results of a centrifuge and evaporation trial.

200 g of barley hydrolyzate (13% glucose) plus 10% excess urea were centrifuged at 200 rpm for 20 hours. 105g of liquid and 105g of cake were obtained. The liquid and the cake were evaporated to yield 45.15 g of syrup, and 55.7g of cake, respectively; they were mixed together to give a mixture with a water content of 35%. This mixture was dried at 75° C for 20 hours. 73g of a solid were obtained that gave the following analysis: glucose, 3% (conversion 90%); ammonia plus urea, expressed as urea, 3.4%; combined nitrogen, expressed as monoglucosyl urea, 37%, total nitrogen, 8.51%.

EXAMPLE XI

This example shows the results obtained when the hydrolyzate was cooked instead of dried in accordance with the invention.

To 1000g of barley hydrolyzate containing 138g of glucose, were added 50g of urea (10% excess) plus 10g of 85% phosphoric acid. 1000g of this mixture were evaporated to 395g of solid. This solid was placed in a closed container and kept at 75° C for 14 hours. At this stage no loss of water was observed. The solid pastry product showed the following analysis: glucose, 8% (conversion of glucose 77%); urea plus ammonia, expressed as urea, 3.98%; combined nitrogen, expressed as monoglucosyl urea, 25%; total nitrogen, 6.76%.

A principal advantage of our product is that it can be produced with a high total equivalent crude protein content, with up to 90% of this crude protein in a slow ammonia release, urease-resistant form. The following examples are from animal feeding trials using various forms of our product and demonstrating the effectiveness of the product.

EXAMPLE XII

For the purpose of this trial, steers of Hereford breeding were divided into two groups; one group fed a ration which contained no supplemental protein, the other group fed a ration which contained the solid NPN product prepared as in Example IV. These mixtures constituted 33% of the final ration and were formulated to contain similar levels of all nutrients except crude protein. See Table 1.

TABLE 1

| Ingredients | Formulation of Diets | |
|---|---|---|
| | Control ration (%) | Solid non-protein nitrogen ration (%) |
| Straw (oats) | 66.7 | 66.7 |
| Concentrate | 33.3 | 33.3 |
| Composition of Concentrate | | |
| Barley | 93.7 | 61.5 |
| Ground limestone | 1.6 | 2.4 |
| Trace mineralized salt | 1.0 | 1.0 |
| Vitamin premix[11] | 2.0 | 2.2 |
| Barley-based non-protein nitrogen | — | 32.8 |

[11]To supply 2,300, 380 and 2.3 IU of Vitamins A, $D_3$ and E, respectively, per pound of total Ration.

| Composition of Total Ration | | | |
|---|---|---|---|
| Moisture | (%) | 15.8 | 15.5 |
| Crude protein | (%) | 5.9 | 8.9 |
| Calcium | (%) | 0.3 | 0.34 |

TABLE 1-continued

| | Formulation of Diets | | |
|---|---|---|---|
| Phosphorus | (%) | 0.21 | 0.26 |
| Digestible energy | Mcal/pound | 1.08 | 1.05 |

From Table 2, we see that the steers fed with the solid non-protein nitrogen supplement gained 20% faster than did the animals that received the control ration; they also ate more and neeed a lower amount of intake per pound gained.

TABLE 2

Effects of Crude Protein Supplementation On the Performance of Growing Steers

| | | Control | Non-protein Nitrogen |
|---|---|---|---|
| Number of steers | | 16 | 16 |
| Feeding period | days | 154 | 154 |
| Av. initial weight | pounds | 527 | 530 |
| Av. final weight | pounds | 612 | 632 |
| Av. daily gain | pounds | 0.55 | 0.66 |
| Av. daily feed | pounds | 12.5 | 13.3 |
| Feed/gain[12] | | 22.47 | 21.2 |

[12]Feed intake is given on an as-fed basis (approximately 84.5% dry matter).

EXAMPLE XIII

In this example, three groups of steers were fed rations supplemented with one of the following: (1) our NPN product, prepared as in example IV; (2)soymeal (which is a premium plant source of protein); and (3)urea. A fourth control group was not fed any supplement.

The growing ration used was based on corn silage with a "barley-protein supplemented" concentrate to provide an overall ration with an energy equivalent of approximately 1.17 Mcal per pound of dry matter. The equivalent crude protein content of the unsupplemented control was 0.94 pounds per pound of dry matter, while that of the supplemented rations was 0.11 pounds per pound of dry matter.

The results of the trial, the compositions of the concentrates, and the nutrient content of the feed are given in the following tables:

TABLE 3

| | 301 (Control) (No supplement) | 302 (Soymeal) | 303 (Test NBN) | 304 (Urea) |
|---|---|---|---|---|
| Number of animals | 144 | 143 | 144 | 144 |
| Days on test | 118 | 105 | 103 | 119 |
| Pounds Silage consumed per head/day | 47.89 | 50.27 | 49.30 | 48.97 |
| Concentrate consumed per head/day | 2.99 | 3.13 | 3.07 | 3.06 |
| Pounds total dry matter consumed per head/day | 14.66 | 15.39 | 15.09 | 14.99 |
| Average total gain (pounds per head) | 184.7 | 185.7 | 184.5 | 195.4 |
| Average daily gain | 1.56 | 1.77 | 1.79 | 1.64 |
| Conversion ratio (dry matter consumed per pound gain) | 9.37 | 8.70 | 8.43 | 9.13 |

TABLE IV

| | Concentrate Composition | | | |
|---|---|---|---|---|
| | 301 Low Protein | 304 Urea | 302 Soybean Meal | 303 Test NPN |
| Ingredient: | | | | |
| Ground Barley | 95.35 | 92.12 | 71.17 | 74.01 |
| Urea (45% N) | — | 3.23 | — | — |
| Soybean Meal | — | — | 24.58 | — |
| Test NPN | — | — | — | 21.56 |
| Dicalcium phosphate | — | 0.06 | — | — |
| Ground Limestone | 2.00 | 1.94 | 1.84 | 1.95 |
| Plain Salt | 1.32 | 1.32 | 1.35 | 1.86 |
| Beef Mineral/Vitamin Pre. | 0.332 | 0.332 | 0.332 | 0.332 |
| Sodium tripolyphosphate | 0.710 | 0.710 | 0.430 | — |
| Elemental Sulfur | 0.286 | 0.286 | 0.286 | 0.286 |
| Total | 100.0 | 100.0 | 100.0 | 100.0 |
| Nutrient: | | | | |
| Dry Matter (%) | 88.56 | 88.95 | 88.78 | 88.96 |
| Crude Protein (%) | 11.08 | 19.77 | 19.75 | 19.78 |
| Digestible Protein (%) | 6.88 | — | 15.47 | — |
| M.E. Rum. (Mcal/lb) | 1.144 | 1.106 | 1.115 | 1.101 |
| TDN (%) | 69.56 | 67.20 | 69.87 | 66.90 |
| Calcium (%) | 0.810 | 0.797 | 0.813 | 0.807 |
| Phosphorus (%) | 0.515 | 0.515 | 0.519 | 0.515 |
| Sodium (%) | 0.749 | 0.749 | 0.752 | 0.761 |
| Magnesium (%) | 0.092 | 0.089 | 0.135 | 0.096 |
| Potassium (%) | 0.361 | 0.349 | 0.740 | 0.375 |
| Sulfur (%) | 0.481 | 0.477 | 0.554 | 0.481 |
| Iron (mg/lb) | 46.9 | 46.1 | 56.0 | 54.4 |
| Copper (mg/lb) | 14.5 | 14.4 | 15.5 | 30.5 |
| Manganese (mg/lb) | 22.4 | 22.2 | 24.0 | 22.7 |
| Zinc (mg/lb) | 78.2 | 77.6 | 74.3 | 85.2 |
| Crude Fat (%) | 1.8 | 1.8 | 1.7 | 1.4 |
| Crude Fiber (%) | 4.8 | 4.6 | 4.9 | 3.7 |

TABLE V

Nutrient Content of a 1:4 Blend of Concentrate and Corn Silage C.M. (% of DM)

| | 301 Low Protein | 304 Urea | 302 Soybean Meal | 303 Test NPN |
|---|---|---|---|---|
| Dry Matter (%) | 100.0 | 100.0 | 100.0 | 100.0 |
| Crude Protein (%) | 9.43 | 11.20 | 11.20 | 11.20 |
| M.E. (Rum) (Mcal/lb)* | 1.176 | 1.167 | 1.177 | 1.166 |
| TDN (%)* | 71.55 | 71.01 | 71.60 | 70.95 |
| Calcium (%) | 0.379 | 0.376 | 0.379 | 0.377 |
| Phosphorus (%) | 0.335 | 0.334 | 0.335 | 0.334 |
| Sodium (%) | 0.211 | 0.210 | 0.211 | 0.213 |
| Magnesium (%) | 0.207 | 0.206 | 0.175 | 0.187 |
| Potassium (%) | 0.934 | 0.934 | 1.01 | 0.936 |
| Sulfur (%) | 0.123 | 0.122 | 0.138 | 0.123 |
| Iron (mg/lb) | 115.6 | 115.40 | 117.5 | 117.0 |
| Copper (mg/lb) | 5.9 | 5.9 | 6.1 | 9.2 |
| Manganese (mg/lb) | 20.6 | 20.5 | 20.9 | 20.6 |
| Zinc (mg/lb) | 30.5 | 30.4 | 29.7 | 31.9 |
| Fiber (Mg/lb) | 22.7 | 22.7 | 22.7 | 22.5 |
| Vitamin A (I.V./lb) | 3700.0 | 3700.0 | 3700.0 | 3700.0 |

ME - Metabolitable energy
TDN - Total digestible nutrients

From these data, it will be seen that 1. in terms of feed conversion ratio, the the NPN supplement out-performed all other groups, followed by the soymeal, the urea, and the control group. The observed difference between the soymeal and the NPN group — and other groups — was statistically significant at the 95% confidence level, while the difference between the soymeal and the NPN group was not significant at this level.
2. the soymeal and the NPN groups gained approximately at the same rate, and at a significantly higher rate than the control or the urea group. The urea group gained at a significantly faster rate than the control group.
3. in terms of feed intake, the soymeal group consumed significantly more, while the control group consumed significantly less feed than the other groups.

While certain examples, structures, compositions and process steps have been described for purposes of illustration the invention is not limited to these. Variations and modifications within the scope of the disclosure and the claims can readily be effected by those skilled in the art.

What is claimed is:

1. A process for producing a non-protein nitrogen feed supplement for ruminants which comprises:

mixing glucose, produced by the hydrolysis of starch in grain selected from the group consisting of barley, wheat and corn, said glucose still being associated with the other normal constituents of the grain, with water, urea and sufficient mineral acid to provide a mixture having a starting pH of about 2 – 4, said glucose being the major dry matter constituent of said mixture; and drying the mixture at an elevated temperature for sufficient time to cause urea and the major portion of the glucose to react and form urease - resistant glucosyl ureides in solid form.

2. The process as set forth in 1 wherein:

the urea is provided in excess of that amount required to react stoichiometrically with the glucose to produce monoglucosyl ureide.

3. A feed supplement for ruminants comprising a solid, condensation reaction product formed by the process of claim 1.